United States Patent
Caullier et al.

(10) Patent No.: US 9,045,241 B2
(45) Date of Patent: Jun. 2, 2015

(54) METHOD FOR REDUCING THE ANGULAR MOMENTUM AND CONTROLLING THE ATTITUDE OF A SPACECRAFT

(71) Applicant: Thales, Neuilly sur Seine (FR)

(72) Inventors: François Caullier, Toulouse (FR); Faustine Delhay, Toulouse (FR); Jean-Marc Lacambre, Toulouse (FR); Etienne Brouillard, Toulouse (FR)

(73) Assignee: THALES, Neuilly sur Seine (FR)

( * ) Notice: Subject to any disclaimer, the term of this patent is extended or adjusted under 35 U.S.C. 154(b) by 0 days.

(21) Appl. No.: 13/945,821

(22) Filed: Jul. 18, 2013

(65) Prior Publication Data

US 2014/0032022 A1 Jan. 30, 2014

(30) Foreign Application Priority Data

Jul. 27, 2012 (FR) ...................... 12 02130

(51) Int. Cl.

| | |
|---|---|
| *B64G 1/00* | (2006.01) |
| *B64G 1/28* | (2006.01) |
| *B64G 1/24* | (2006.01) |
| *B64G 1/26* | (2006.01) |
| *B64G 1/36* | (2006.01) |
| *G05D 1/08* | (2006.01) |

(52) U.S. Cl.
CPC ............. *B64G 1/288* (2013.01); *B64G 1/283* (2013.01); *G05D 1/0883* (2013.01); *B64G 1/24* (2013.01); *B64G 1/26* (2013.01); *B64G 1/285* (2013.01); *B64G 1/36* (2013.01); *B64G 2001/245* (2013.01)

(58) Field of Classification Search
CPC ............ B64G 1/00; B64G 1/10; B64G 1/242; B64G 1/26; B64G 1/281; B64G 1/283; B64G 1/285; B64G 1/286; B64G 1/288; B64G 1/426

USPC .......... 701/1–4, 13, 14; 244/158.1, 164, 165, 244/169, 171, 171.1, 171.2, 171.3
See application file for complete search history.

(56) References Cited

U.S. PATENT DOCUMENTS

| | | | | |
|---|---|---|---|---|
| 3,171,612 | A | * | 3/1965 | Hildebrant .................... 244/165 |
| 3,997,137 | A | * | 12/1976 | Phillips .......................... 244/169 |
| 4,023,752 | A | * | 5/1977 | Pistiner et al. ................. 244/169 |

(Continued)

FOREIGN PATENT DOCUMENTS

| | | |
|---|---|---|
| EP | 0 788 045 A1 | 8/1997 |
| EP | 0 795 806 A2 | 9/1997 |

(Continued)

*Primary Examiner* — Thomas Tarcza
*Assistant Examiner* — Tyler J Lee
(74) *Attorney, Agent, or Firm* — Baker and Hostetler LLP

(57) ABSTRACT

A method for reducing the angular momentum of a spacecraft comprises a propulsion device able to generate a torque along a Z axis corresponding to an axis of maximum inertia or minimum inertia of the spacecraft, an X axis and a Y axis forming with Z an orthogonal frame; an angular momentum accumulating device, able to generate an angular momentum and a torque along the three axes; and a set of sensors able to measure the angular velocities and estimate the angular momentum of the spacecraft. The method comprises a first step of aligning the angular momentum of the spacecraft along the Z axis, consisting in slaving the angular momentum of the angular momentum accumulating device to the angular velocity of the spacecraft, and a second step of reducing the angular momentum of the spacecraft using a torque generated by the propulsion device.

12 Claims, 5 Drawing Sheets

(56) References Cited

U.S. PATENT DOCUMENTS

| | | | |
|---|---|---|---|
| RE30,429 E * | 11/1980 | Phillips | 244/169 |
| 5,931,421 A | 8/1999 | Surauer et al. | |
| 6,032,903 A | 3/2000 | Fowell et al. | |
| 6,341,249 B1 * | 1/2002 | Xing et al. | 701/13 |
| 7,661,627 B2 * | 2/2010 | Defendini et al. | 244/165 |
| 8,346,410 B2 * | 1/2013 | Seo et al. | 701/13 |

FOREIGN PATENT DOCUMENTS

| | | |
|---|---|---|
| EP | 1 024 082 A2 | 8/2000 |
| EP | 1 428 754 A1 | 6/2004 |

* cited by examiner

METHOD FOR REDUCING THE ANGULAR MOMENTUM AND CONTROLLING THE ATTITUDE OF A SPACECRAFT

CROSS-REFERENCE TO RELATED APPLICATION

This application claims priority to foreign French patent application No. FR 1202130, filed on Jul. 27, 2012, the disclosure of which is incorporated by reference in its entirety.

FIELD OF THE INVENTION

The present invention relates to the field of attitude and orbit control systems (AOCS) for spacecraft. More particularly, it relates to a method for reducing the angular momentum of a satellite, which method may be implemented after a launch vehicle separation phase or even when the satellite goes into survival mode.

BACKGROUND

An attitude and orbit control system comprises an assortment of on-board hardware and software components that allow a spacecraft to be controlled in order to orient it with the desired attitude and adjust its orbit to the requirements of the mission. In the case, for example, of a geostationary telecommunications satellite, it is sought to keep the orientation of the satellite constant relative to Earth, in order to allow various mission instruments to operate. For this purpose, an AOCS system generally comprises various sensors for detecting the attitude and position of the satellite, actuators, such as propulsion devices and devices for accumulating angular momentum, for modifying its position and attitude, and a flight software package that ensures the orientation and stable orbit of the satellite in the various life phases of the satellite.

During separation of the satellite from its launch vehicle, or when the satellite goes into survival mode following a system failure, the attitude and angular momentum of the satellite are not under control. The initial phase, which consists in stabilising the attitude of the satellite, by reducing its angular momentum, and in orienting it in a desired direction, for example towards the Sun, is a critical phase of the attitude control. The present invention provides a novel method for reducing angular momentum in order to simplify demands on the actuators of the attitude control system and to enable novel satellite architectures, in particular as regards propulsion devices. According to another aspect of the invention, the method advantageously makes it possible to reduce the impact that the angular momentum reducing operation has on the orbit of the satellite.

A common satellite architecture generally consists of a subassembly of hardware and software components, such as telecommunication or observation systems, called the mission subassembly, and what is called a structural subassembly that groups together the hardware and software components required for proper operation of the satellite, from separation with the launch vehicle to the end of the lifetime of the satellite. FIG. 1 shows the structural hardware of a common architecture for an Earth-orbiting satellite. Solar panels 11 are fixed to the structure of the satellite in order to provide the satellite with a power supply throughout its lifetime. An attitude and orbit control system AOCS also forms part of the structural hardware. An AOCS system in particular comprises a set of sensors 12, a propulsion device 13 comprising one or more thrusters 14, and an angular momentum accumulating device 15.

The set of sensors 12, which has the role of detecting the attitude and position of the satellite, for example comprises Earth sensors, Sun sensors and star trackers. Other sensors (gyrometers, accelerometers) allow variations in position or attitude to be measured. The set of sensors 12 delivers an estimation of the position and attitude of the satellite in the three dimensions of space.

The propulsion device 13 in general comprises a number of thrusters 14 fixed in various locations on the structure of the satellite. By delivering a thrust in the direction of the centre of gravity of the satellite, the propulsion device allows the trajectory of the satellite to be corrected and its position on its orbit to be modified. By applying a force away from the centre of gravity, it also allows a torque to be created and therefore the attitude of the satellite to be modified. A first type of thruster, called a chemical thruster, consumes a chemical propellant. It delivers a high-power thrust but has a relatively high consumption meaning that a disadvantageous amount of propellant must be carried on-board the satellite. In a second type of thruster, called a plasma thruster, or electric thruster, xenon atoms are ionised by collision with electrons. Thrust is generated when the charged xenon ions are accelerated out of the thruster by an electromagnetic field. Although they are expensive and have a high initial weight, electric thrusters are substantially more effective than chemical thrusters.

The propulsion device 13 is used both for the transfer from the launch orbit to the mission orbit and to keep the satellite in place on its mission orbit, and to control the attitude of the satellite. To do this, a common satellite architecture generally comprises a number of thrusters allowing the position and attitude of the satellite to be controlled along three axes. To reduce cost and to increase the payload capacity of a satellite, it is desirable to limit the number of thrusters fitted to the satellite and to reduce the amount of fuel required. The use of electric thrusters, which requires a fuel tank that is less heavy and less bulky, is a first optimisation approach. Propulsion systems comprising mechanical means allowing the thrust axis of the thruster to be moved, with the aim of limiting the number of thrusters required, are also known.

An AOCS system also relies on an angular momentum accumulating device 15, such as, for example, a set of reaction wheels, flywheels or gyroscopic actuators. An electric motor drives a flywheel in rotation about an axis of the satellite, a variation in the angular velocity generating a torque that by reaction drives the satellite to rotate about its centre of gravity. An angular momentum accumulating device 15 comprising, for example, three reaction wheels (or four wheels for the sake of redundancy) allows the attitude of the satellite to be stabilised and controlled along the three axes of the satellite.

In practice, operation of the angular momentum accumulating device 15 is closely tied with operation of the propulsion device 13. By applying thrust slightly away from the centre of gravity, it is possible to both modify the trajectory of the satellite and create a torque that can, for example, be used to off-load the reaction wheels while preserving the attitude of the satellite. The software of the AOCS system thus comprises algorithms that centralise the measurements of the sensors 12 and control the position and attitude of the satellite by controlling the propulsion device 13 and the angular momentum accumulating device 15 in the various life phases of the satellite.

FIG. 2 illustrates how a satellite is launched into a geostationary orbit. A launch vehicle transports the satellite to a low-Earth orbit. At the perigee P of the orbit, the satellite is separated and ejected from the payload fairing of the launch vehicle by means of, for example, a mechanical device employing springs. Injection into mission orbit then comprises a number of steps. In a first step, called the SAM (Sun acquisition mode) step, the satellite, the initial angular velocity of which is not controlled, must be stabilised. Its orientation is then kept constant relative to the Sun, the solar panels being partially deployed in order to provide the satellite with a supply of electrical power. When the apogee A of the orbit is approached, the satellite is reoriented in order to allow the propulsion device to deliver a thrust tangential to the orbit. This acceleration near the apogee, which may be repeated over a number of revolutions, allows the eccentricity of the orbit to be reduced until the desired geostationary orbit is obtained. The initial step after separation from the launch vehicle, which consists in stabilising the attitude of the satellite, starting from an uncontrolled initial situation, and achieving a target orientation, is a critical phase controlled by dedicated algorithms of the AOCS system.

This situation is also encountered when the satellite goes into survival mode following a system failure. The same algorithms are then implemented to stabilise the attitude and orient the satellite relative to the Sun until a solution can be found to the system failure.

In known systems deployed at the present time, the propulsion device is controlled in order to generate a torque that opposes the rotation of the satellite. The various thrusters are activated so as to slow rotation in succession on the three axes; this operation in general being repeated a number of times until the angular velocity along each axis is reduced to a value close to zero. After stabilisation, the angular momentum accumulating device is controlled in order to orient the satellite in the desired direction.

However, this approach suffers from drawbacks that the present invention seeks to overcome. In particular, the satellite must be equipped with a large number of thrusters. A common geostationary satellite architecture typically comprises between ten and fifteen thrusters in order to ensure control of attitude and orbit. Electric thrusters, which are heavier and more expensive, cannot be used throughout the propulsion system; chemical thrusters are still necessary, to the detriment of the weight of fuel required.

Reduction in the angular momentum is obtained by the thrust delivered by a thruster. In addition to the torque generated, the thrust causes a movement of the centre of gravity of the satellite, in other words a velocity increment is imparted to the satellite. The velocity increment imparted during the angular momentum reducing phase is another drawback of known systems. In particular, in the case where a number of satellites are launched from the same launch vehicle, the satellites are located very close to each other after separation and any velocity increment represents a collision risk. Likewise, a correction of orbit is necessary after entering into survival mode if the velocity increment is too large.

SUMMARY OF THE INVENTION

The invention aims to provide an alternative way of reducing the angular momentum of a spacecraft, allowing its attitude to be controlled, while overcoming the drawbacks of existing solutions such as described above.

For this purpose, the subject of the invention is a method for reducing the angular momentum of a spacecraft, said spacecraft comprising:
- a propulsion device able to generate a torque of modulatable amplitude along a Z axis, said Z axis corresponding substantially to an axis of maximum inertia or minimum inertia of the spacecraft, an X axis and a Y axis forming with Z a direct orthogonal frame attached to the spacecraft;
- an angular momentum accumulating device, able to generate and control, via control of the angular velocities of flywheels belonging to the angular momentum accumulating device, an angular momentum and a torque along the X, Y and Z axes; and
- a set of sensors able to measure the angular velocities of the spacecraft along the X, Y and Z axes, and to deliver an estimation of the angular momentum of the spacecraft.

The method according to the invention comprises:
- a first step of aligning the angular momentum of the spacecraft along the Z axis, consisting in slaving the angular momentum, along the X axis and the Y axis, respectively, of the angular momentum accumulating device, to the angular velocity of the spacecraft, along the Y axis and the X axis, respectively, creating gyroscopic torques that tend to reduce the angular velocities of the spacecraft along the X and Y axes; and
- a second step of reducing the angular momentum of the spacecraft by means of a Z-axis torque generated by the propulsion device.

Advantageously, the alignment step comprises:
- a step of calculating angular momentum setpoints $H_x$, $H_y$ and $H_z$ for the angular momentum accumulating device along the X, Y and Z axes, respectively, depending on the angular velocities $\omega_x$, $\omega_y$ and $\omega_z$ of the spacecraft along the X, Y and Z axes, respectively, by means of the following relationships, when $\omega_z$ is positive:

$$H_x = K\omega_y$$

$$H_y = -K\omega_x$$

$$H_z = 0$$

in which K is a preset coefficient; the same relationships being employed when $\omega_z$ is negative, the coefficient K being replaced with a coefficient K'; said coefficient K' being given by the relationship K'=−K; and
- a step of controlling the angular velocities of the flywheels so as to set the angular momentum of the flywheels along each of the axes to the setpoint values $H_x$, $H_y$ and $H_z$ determined in the preceding step, the alignment step continuing provided that the angular velocity of the spacecraft along the X and Y axes is higher than a preset threshold.

The invention also relates to an attitude and orbit control system comprising a control module containing code instructions allowing a method having the features described above to be implemented.

The invention also relates to an Earth-orbiting satellite equipped with an attitude and orbit control system having the features described above.

BRIEF DESCRIPTION OF THE ACCOMPANYING DRAWINGS

The invention will be better understood and other advantages will become apparent on reading the detailed description of embodiments given by way of example in the following figures:

FIG. 1, presented above, shows the structural hardware of a common architecture for an Earth-orbiting satellite;

FIG. 2, presented above, illustrates how a satellite is launched into a geostationary orbit;

For the sake of clarity, the same elements have been given the same references in the various figures.

DETAILED DESCRIPTION

Figure 1:
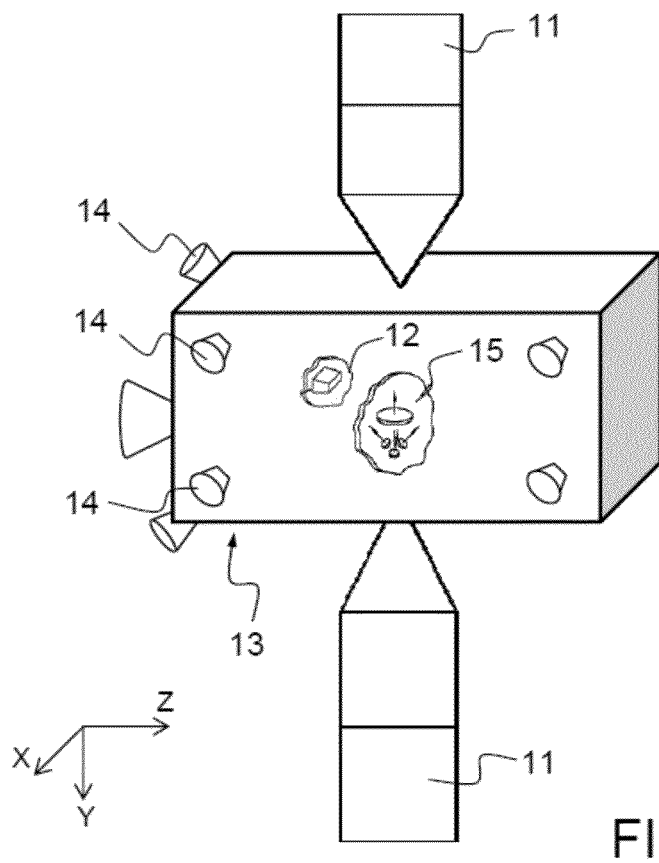
Figure 2:
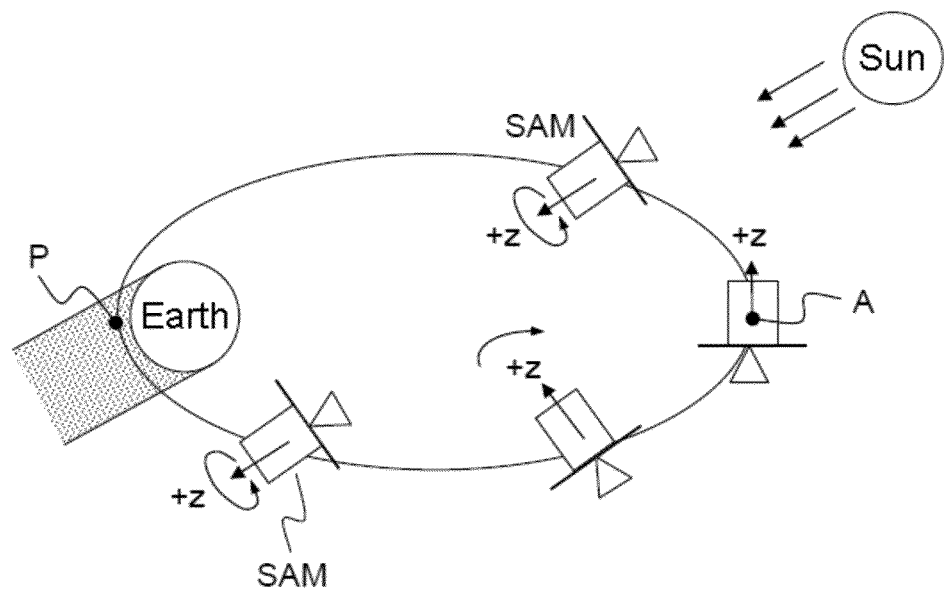

The method provided by the present invention is firstly intended for application in an attitude and orbit control system for a satellite. It is particularly able to meet the need to control the attitude of a satellite after a launch vehicle separation phase, or when the satellite enters into survival mode. However the invention is not limited to this application and the method may be applied in the same way and with the same advantages more generally to any spacecraft for which it is desired to reduce the angular momentum starting from an uncontrolled initial situation.

The method may be implemented in a spacecraft comprising:
- a propulsion device 13 able to generate a torque of modulatable amplitude along a Z axis, said Z axis corresponding substantially to an axis of maximum inertia or minimum inertia of the spacecraft, an X axis and a Y axis forming with Z a direct orthogonal frame attached to the spacecraft;
- an angular momentum accumulating device 15, able to generate and control, via control of the angular velocities of flywheels belonging to the angular momentum accumulating device, an angular momentum and a torque along the X, Y and Z axes; and
- a set of sensors 12 able to measure the angular velocities ($\omega_x$, $\omega_y$, $\omega_z$) of the spacecraft along the X, Y and Z axes, and to deliver an estimation of the angular momentum (h) of the spacecraft.

The method according to the invention consists, in a first step, in aligning the angular momentum along an axis by means of the angular momentum accumulating device 15, before reducing this angular momentum, in a second step, by means of the propulsion device 13 by generating an opposed torque along this axis. As will be described below, the angular momentum may be aligned, according to the method, along the axis of maximum inertia or along the axis of minimum inertia of the spacecraft; the axis of intermediate inertia not enabling the convergence of the method to be guaranteed. Thus, depending on the architecture of the spacecraft, and in particular depending on the arrangement of the propulsion device 13 of the spacecraft, the Z axis chosen for alignment of the angular momentum corresponds substantially to the axis of maximum inertia or axis of minimum inertia of the spacecraft.

The spacecraft has an uncontrolled initial velocity after separation from the launch vehicle, or when it enters into survival mode. In the absence of external disturbances and without the action of the flywheels, the conservation of angular momentum may be expressed by the relationship:

$$\frac{\omega_x^2}{h^2/I_x^2} + \frac{\omega_y^2}{h^2/I_y^2} + \frac{\omega_z^2}{h^2/I_z^2} = 1 \quad (1)$$

in which $\omega_x$, $\omega_y$ and $\omega_z$ are the angular velocities of the spacecraft along the three axes, h is the angular momentum of the spacecraft, and $I_x$, $I_y$ and $I_z$ are the components of the inertia matrix (assumed diagonal) of the spacecraft.

The conservation of kinetic energy may be expressed by the relationship:

$$\frac{\omega_x^2}{2T/I_x} + \frac{\omega_y^2}{2T/I_y} + \frac{\omega_z^2}{2T/I_z} = 1 \quad (2)$$

in which T is the kinetic energy of the spacecraft.

Figure 3A:
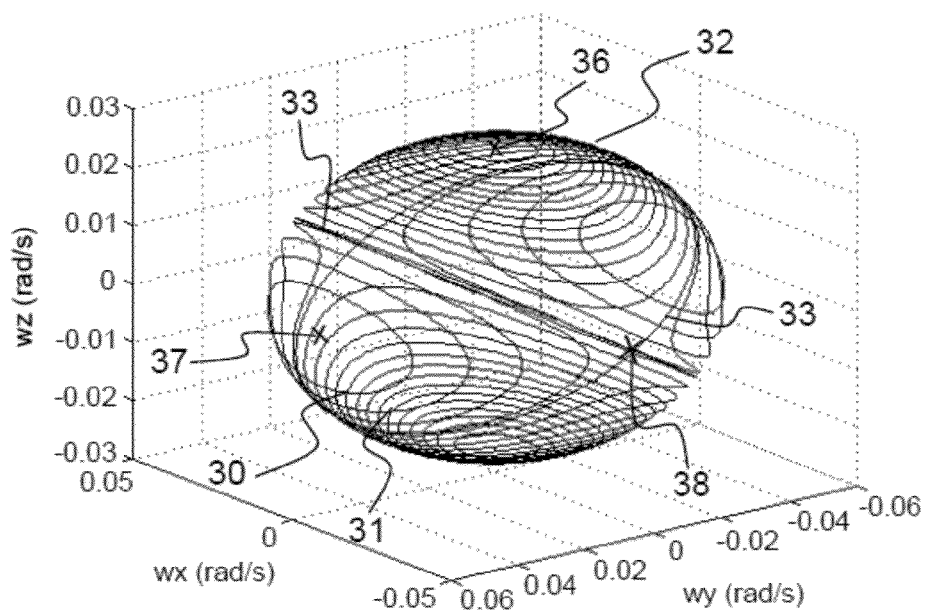
FIGS. 3a and 3b show the spacecraft angular velocity trajectories implemented in a first step, called the alignment step, of aligning the angular momentum of the spacecraft.

The equations (1) and (2) are equations describing ellipsoids. The trajectory followed by the angular velocities of the spacecraft therefore correspond to the intersection of these two ellipsoids. Such a trajectory 30, shown in FIG. 3a, is a polhode.

When the flywheels of the angular momentum accumulating device 15 are activated, the kinetic energy of the spacecraft changes (electrical action of the motor on the wheel). In the absence of external disturbances, the angular momentum of the spacecraft is conserved. By modifying the angular velocity of the flywheels, another polhode 31 is obtained. FIG. 3a thus shows a series of polhodes that can be accessed via action on the flywheels, the angular momentum of the spacecraft being constant and equal to the initial angular momentum $h_{ini}$, for example transferred at the moment of separation from the launch vehicle. The series of polhodes lies on the surface of the ellipsoid 32 of constant angular momentum $h_{ini}$. Three particular points on the ellipsoid 32 will be noted:
- a point 36 of what is called "flat spin", corresponding to angular velocities only about the axis of maximum inertia (the Z axis in the example in FIG. 3a);
- a point 37 of what is called "normal spin", corresponding to angular velocities only about the axis of minimum inertia (the Y axis in the example in FIG. 3a); and
- a point 38 corresponding to the intersection of two transition polhodes 33, the point 38 corresponding to angular velocities only about the third axis of inertia (the X axis in the example in FIG. 3a).

The flat spin and normal spin points are points of equilibrium. A spacecraft having an angular momentum of a value near one of these points traces a short polhode—the angular velocities vary little. As will be described below, the method according to the invention allows convergence on one of these two points of equilibrium.

In contrast, the point 38 of rotation about the intermediate axis of inertia is not an equilibrium position. A spacecraft having initial angular velocities only about the X axis traces a transition polhode 33 and therefore naturally deviates from the operating point 38. Rotation of the spacecraft about the intermediate axis of inertia is not stable.

The principle behind the method according to the invention consists in a first step, called the angular momentum alignment step, in modifying the kinetic energy of the satellite by acting on the flywheels of the angular momentum accumulating device 15 in order to pass from one polhode to another in order to converge on a polhode characterised by an angular velocity concentrated on only one axis.

In the absence of external disturbances, the propulsion device 13 not being activated, the Euler equations applicable to the spacecraft are written:

$$I_x \dot{w}_x + w_y x_z(I_z - I_y) + x_y H_z - w_z H_y + \dot{H}_x = 0$$

$$I_u \dot{w}_y + w_z w_x(I_x - I_z) + w_z H_x - w_x H_z + \dot{H}_y = 0$$

$$I_z \dot{w}_z + w_x w_y(I_y - I_x) + w_x H_y - w_y H_x + \dot{H}_z = 0 \quad (3)$$

in which $\omega_x$, $\omega_y$ and $\omega_z$ are the angular velocities of the spacecraft along the three axes, $H_x$, $H_y$ and $H_z$ are the components of the angular momentum of the angular momentum accumulating device 15 along the three axes, and $I_x$, $I_y$ and $I_z$ are the components of the inertia matrix (assumed diagonal) of the spacecraft.

With the aim of aligning the angular momentum of the spacecraft with the Z axis, the method controls the angular momentum of the angular momentum accumulating device, along the X axis and the Y axis, respectively, depending on the angular velocity of the spacecraft, along the Y axis and the X axis, respectively.

In the case where $\omega_z$ is positive, the method defines angular momentum setpoints for the angular momentum accumulating device using the following relationships:

$$H_x = K w_y$$

$$H_y = -K w_x$$

$$H_z = 0 \quad (4)$$

in which $\omega_x$ and $\omega_y$ are the angular velocities of the spacecraft along the X and Y axes, $H_x$ and $H_y$ are the components of the angular momentum of the angular momentum accumulating device along the X and Y axes, and K is a preset constant coefficient.

In the case where $\omega_z$ is negative, the method defines a coefficient $K' = -K$ applied to the calculation of the angular momentum setpoints $H_x$ and $H_y$ using the relationships (4).

The following is obtained by substituting $H_x$, $H_y$ and $H_z$ by way of setpoints in the Euler equations (3):

$$\left(I_x + \frac{K^2}{I_y}\right)\dot{w}_x = \left(I_y - I_z + \frac{K^2}{I_y}\right)w_y w_z + K\left(\frac{I_x - I_y - I_z}{I_y}\right)w_x w_z \quad (5)$$

$$\left(I_y + \frac{K^2}{I_x}\right)\dot{w}_y = \left(I_z - I_x - \frac{K^2}{I_x}\right)w_x w_z + K\left(\frac{-I_x + I_y - I_z}{I_x}\right)w_y w_z$$

$$I_z \dot{w}_z = (I_x - I_y) w_x w_y + K(w_x^2 + w_y^2)$$

Figure 3B:
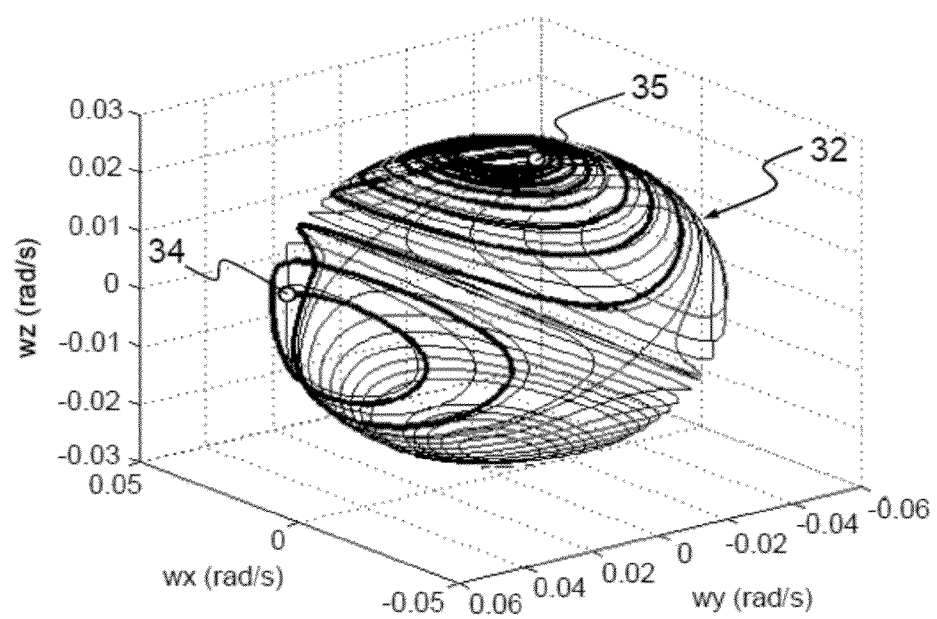

The equations (5) describe the trajectory followed by the angular velocities of a spacecraft the angular momentum accumulating device of which is controlled by means of setpoints defined by the equations (4). The bold line in FIG. 3b shows an example trajectory on the ellipsoid 32 of constant angular momentum $h_{ini}$. In this example, the spacecraft has, in an initial situation represented by the point 34, an angular velocity essentially along the Y axis ($\omega_y$ very much greater than $\omega_x$ and $\omega_z$). By acting on the angular momentum accumulating device 15, the trajectory is made to deviate slowly from the constant kinetic energy polhode. Calculating the angular momentum setpoints using the equations (4) advantageously allows the angular velocity of the spacecraft to be gradually oriented towards the axis of maximum inertia.

Starting from an initial situation where the spacecraft is rotating essentially about the Y axis, the method allows the rotation of the spacecraft to be oriented essentially along the Z axis. At point 35 in FIG. 3b, the method considers the alignment step to be terminated, the angular velocities $\omega_x$ and $\omega_y$ of the spacecraft being sufficiently small. In the case where Z is the axis of maximum inertia, the spacecraft is in what is commonly called a "flat spin" situation. In the case where Z is the axis of minimum inertia, the spacecraft is in what is commonly called a "normal spin" situation.

In summary, the method according to the invention comprises a first step of aligning the angular momentum of the spacecraft along the Z axis, consisting in slaving the angular momentum, along the X axis and the Y axis, respectively, of the angular momentum accumulating device 15, to the angular velocity of the spacecraft, along the Y axis and the X axis, respectively, creating gyroscopic torques that tend to reduce the angular velocity of the spacecraft along the X and Y axes.

Advantageously, the alignment step comprises:
  a step of calculating angular momentum setpoints $H_x$, $H_y$ and $H_z$ for the angular momentum accumulating device 15 along the X, Y and Z axes, respectively, depending on the angular velocities $\omega_x$, $\omega_y$ and $\omega_z$ of the spacecraft along the X, Y and Z axes, respectively, by means of the following relationships, when $\omega_z$ is positive:

$$H_x = K\omega_y$$

$$H_y = -K w_x$$

$$H_z = 0$$

in which K is a preset coefficient; the same relationships being employed when $\omega_z$ is negative, the coefficient K being replaced with a coefficient K'; said coefficient K' being given by the relationship $K' = -K$; and
  a step of controlling the angular velocities of the flywheels so as to set the angular momentum of the flywheels along each of the axes to the setpoint values $H_x$, $H_y$ and $H_z$ determined in the preceding step,
the alignment step continuing provided that the angular velocity of the spacecraft along the X and Y axes is higher than a preset threshold.

Whether this angular momentum alignment step converges depends on the value of the coefficient K, on the value of the initial angular momentum $h_{ini}$, and on parameters intrinsic to the spacecraft, such as notably the inertia matrix of the spacecraft and of the angular momentum accumulating device 15.

In a preferred embodiment of the invention, the method defines the coefficient K, in a preliminary step, depending on the initial conditions of the spacecraft defined when the method for reducing angular momentum is launched, for example after separation from the launch vehicle or on entry into survival mode.

It will also be noted that, according to the method, the coefficient K thus defined is applied to calculate setpoints using the relationships (4) in the case where $\omega_z$ is positive. In the case where $\omega_z$ is negative, a coefficient $K' = -K$ is defined, which coefficient is used to calculate the angular momentum setpoints Hx and Hy of the flywheels using the relationships (4).

To demonstrate that the method of calculating the angular momentum setpoints $H_x$ and $H_y$ by means of the relationships (4) ensures convergence towards alignment of the angular momentum along the Z axis, the case of a telecommunications satellite equipped with an angular momentum accumulating device 15 consisting of three reaction wheels having X, Y and Z axes, respectively, will be considered. The kinetic energy T of the spacecraft is then written:

$$2T = I_x w_x^2 + I_y w_y^2 + I_z w_z^2 + I_s w_1^2 + I_s w_2^2 \quad (6)$$

in which $I_s$ is the inertia of the reaction wheels, and $\omega_1$ and $\omega_2$ are the angular velocities of the reaction wheels along the X and Y axes.

Calculation of the angular momentum setpoints yields:

$$I_s w_1 = K w_y$$

$$I_s w_2 = -K w_x \tag{7}$$

Substitution of these setpoints into equation (6) gives:

$$2T = \left(I_x + \frac{K^2}{I_s}\right)w_x^2 + \left(I_y + \frac{K^2}{I_s}\right) + \left(I_y + \frac{K^2}{I_s}\right)w_y^2 + I_z w_z^2 \tag{8}$$

The derivative of this equation is written:

$$\dot{T} = \left(I_x + \frac{K^2}{I_s}\right)w_x \dot{w}_x + \left(I_y + \frac{K^2}{I_s}\right)w_x w_x + \left(I_y + \frac{K^2}{I_s}\right)w_y \dot{w}_y + I_z w_z \dot{w}_z \tag{9}$$

The variation in kinetic energy can be expressed, by substituting the angular velocity derivatives from the Euler equations (5), by the following relationship:

$$\dot{T} = 2J_{xy} w_x w_y w_z + J_x w_x^2 w_z + J_y w_y^2 w_z \tag{10}$$

in which $J_x$, $J_y$ and $J_{xy}$ are constants equal to:

$$J_x = \frac{I_x + \frac{K^2}{I_s}}{I_x + \frac{K^2}{I_y}} K\left(\frac{I_x - I_y - I_z}{I_y}\right) + K \tag{11}$$

$$J_y = \frac{I_y + \frac{K^2}{I_s}}{I_y + \frac{K^2}{I_x}} K\left(\frac{-I_x + I_y - I_z}{I_x}\right) + K$$

$$J_{xy} = \frac{1}{2}\begin{bmatrix} \frac{I_x + \frac{K^2}{I_s}}{I_x + \frac{K^2}{I_y}}\left(I_y - I_z + \frac{K^2}{I_y}\right) + \\ \frac{I_y + \frac{K^2}{I_s}}{I_y + \frac{K^2}{I_x}}\left(I_z - I_x - \frac{K^2}{I_x}\right) + I_x - I_y \end{bmatrix}$$

The relationship (10) is equivalent to the relationship:

$$\dot{T} = (w_x \quad w_y) A \begin{pmatrix} w_x \\ w_y \end{pmatrix} w_z \tag{12}$$

in which A is the matrix:

$$A = \begin{bmatrix} J_x & J_{xy} \\ J_{xy} & J_y \end{bmatrix} \tag{13}$$

In the chosen example of a telecommunications satellite the following values:

$$I_x=500;\ I_y=400;\ I_z=800;\ I_s=0.03;\ \text{and}\ K=120,$$

give eigenvalues for the matrix A of $-2.49 \times 10^5$ and $-1.8085 \times 10^5$. These negative eigenvalues indicate that the variation in kinetic energy, expressed by the relationship (12), is negative, i.e. the energy of the satellite decreases. The convergent point is reached when $\omega_x = \omega_y = 0$.

In summary, the method for calculating angular momentum setpoints by means of the relationships (4) reduces the kinetic energy of the satellite while ensuring convergence towards angular velocities of zero along the X and Y axes, i.e. in this case towards a flat spin.

It will also be noted that the method also allows the direction of the rotation obtained as a result of the alignment step to be controlled. The trajectory shown in FIG. 3b converges on a positive angular velocity about the Z axis ("North pole" of the ellipsoid). To do this the trajectory crosses curve 33, called the transition polhode, with a positive angular velocity (the curve 33 is crossed in the "northern hemisphere" of the ellipsoid). If, because of the layout of the propulsion device 13, it is desired for the rotation of the spacecraft about the Z axis to be of opposite sign ("South pole" of the ellipsoid), the method may be configured to halt the action of the flywheels before the curve 33 is crossed. The trajectory then follows the constant kinetic energy polhode. On this polhode, the method will reactivate the action of the flywheels when the trajectory achieves a negative angular velocity, the trajectory then crosses the curve 33 in the "southern hemisphere" of the ellipsoid and converges on a negative angular velocity about the Z axis. This feature of the method is particularly advantageous because it means that the angular momentum of the spacecraft can be reduced even when it is equipped with a propulsion device that can generate a Z-axis torque in only one direction. The method according to the invention only requires a single thruster, configured to deliver a torque along the axis of maximum inertia or along the axis of minimum inertia, to reduce angular momentum.

Advantageously, the alignment step thus comprises a step consisting in suspending the slaving of the angular momentum of the angular momentum accumulating device 15 when $\omega_z$ is positive or when $\omega_z$ is negative, making it possible to guarantee a direction for the Z-axis torque required for the step of reducing the angular momentum of the spacecraft.

It will moreover be noted that the Z axis is defined above as corresponding substantially to an axis of maximum inertia or of minimum inertia of the spacecraft. In practice, the natural axes of the spacecraft, such as shown in FIG. 1, might not be exactly aligned with the axes of inertia of the spacecraft. In other words, the inertia matrix of the spacecraft expressed in the frame of reference of the spacecraft will not be strictly diagonal, small nonzero terms may exist beyond the diagonal. The method enables convergence on an axis substantially aligned with the axis of maximum or minimum inertia, for example as illustrated by the point 35 in FIG. 3b. Under these conditions, the angular momentum accumulating device 15 preserves an angular momentum after convergence of the method, hence the angular momentum of the combination of the spacecraft and angular momentum accumulating device 15 corresponds to a flat spin situation. Thus, an axis is considered to be substantially aligned with the axis of maximum or minimum inertia once the capacity of the angular momentum accumulating device 15 is greater than the resulting angular momentum after convergence of the method (it being possible to express the difference between flat spin and a rotation about a natural axis as an angular momentum difference).

After the step of aligning the angular momentum along the Z axis, the method according to the invention comprises a second step of reducing the angular momentum of the spacecraft by means of a Z-axis torque generated by the propulsion device 13.

Figure 4A:
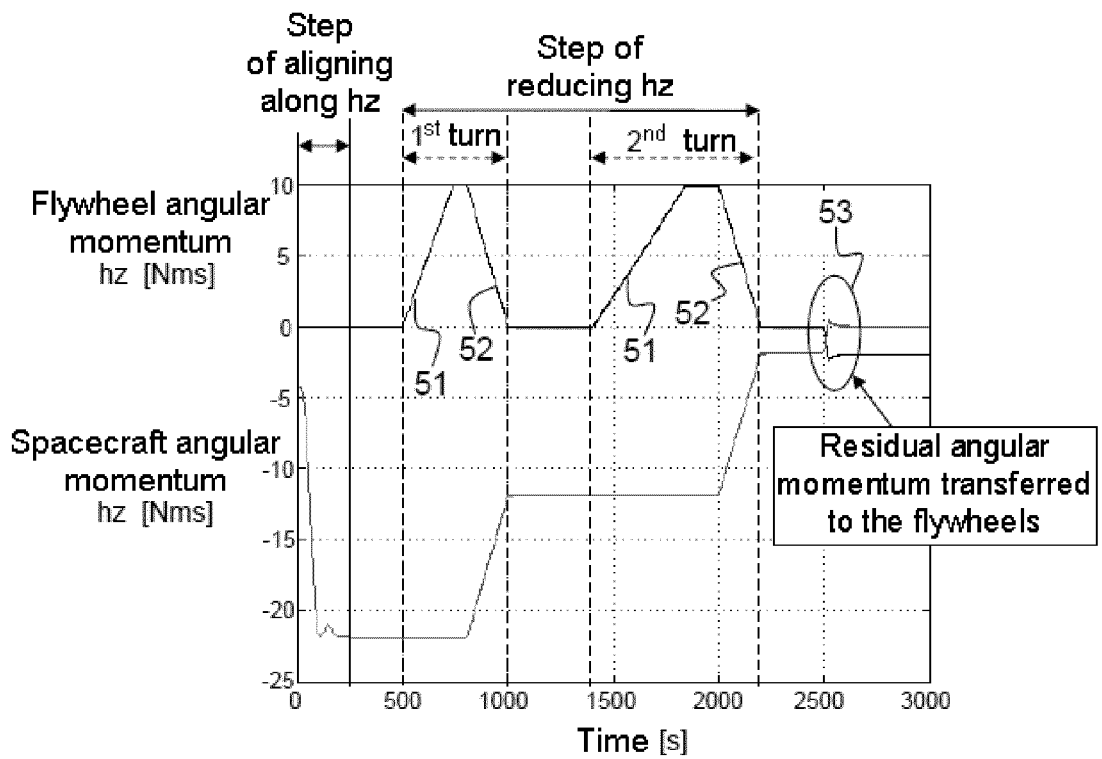
FIGS. 4a, 4b and 4c illustrate the principle of a second step, called the reducing step, of reducing the angular momentum of a spacecraft.
Figure 4B:
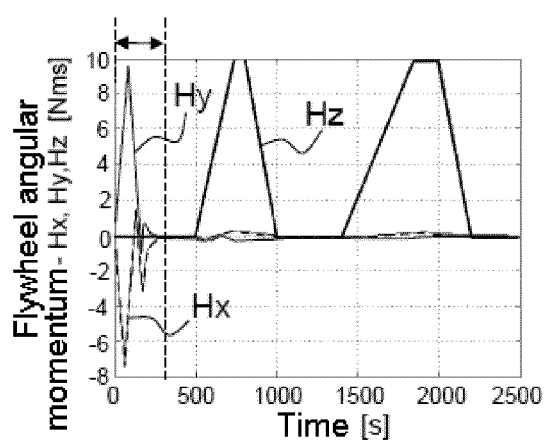
Figure 4C:
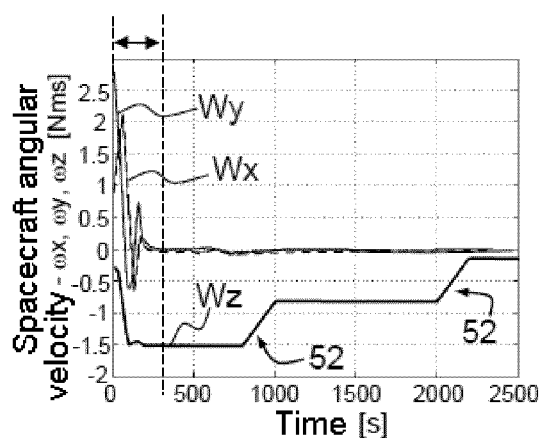

In a first embodiment of the invention, this step consists in controlling the propulsion device so as to generate a torque opposed to the rotation of the spacecraft until an angular velocity lower than a preset threshold is reached. FIGS. 4*a*, 4*b* and 4*c* illustrate the principle of a second embodiment of this step, advantageously allowing velocity increments of the spacecraft associated with use of the propulsion device 13 to be limited.

FIG. 4*a* shows a graph of variations in the angular momentum about Z of the angular momentum accumulating device (top part) and spacecraft (lower part) allowing, according to the method, the angular momentum of the spacecraft to be cancelled out. For this purpose, the method comprises an alignment step, from 0 to 300 seconds, a step of reducing angular momentum, from 500 to 2200 seconds, and a final step, at 2500 seconds, consisting in transferring the residual angular momentum of the spacecraft to the accumulating device. FIGS. 4*b* and 4*c* show, for these steps, the variation in the angular momentum components $H_x$, $H_y$ and $H_z$ of the angular momentum accumulating device (FIG. 4*b*), and in the angular velocities $\omega_x$, $\omega_y$ and $\omega_z$ of the spacecraft (FIG. 4*c*).

As described above, the alignment step allows, via control of the angular momentum components $H_x$ and $H_y$ of the flywheels, gyroscopic torques that tend to reduce the angular velocities $\omega_x$ and $\omega_y$ of the spacecraft, to be created. After this step, the angular momentum of the spacecraft is aligned with the Z axis ($h_z$=−22 Nms; $\omega_z$=−15 deg/s, $\omega_x$=$\omega_y$=0).

The step of reducing angular momentum comprises:
a step 51, from about 500 to 700 seconds, of accumulating angular momentum $H_z$ in flywheels by means of a thrust delivered by the propulsion device. During this step, the torque generated by the thrust is absorbed by the angular momentum accumulating device. The angular velocity of the spacecraft remains constant. This step is stopped when the angular momentum $H_z$ equals 10 Nms, the maximum capacity of the flywheels; and
a step 52 of redistributing angular momentum. The angular momentum Hz of the flywheels is gradually reduced by creating a torque that opposes the rotation of the spacecraft about the Z axis. The angular momentum $h_z$ and the angular velocity $\omega_z$ decrease.

Since the angular momentum of the spacecraft is still high ($h_z$=−12 Nms) the two steps 51 and 52 are repeated a second time, from about 1400 seconds to 2200 seconds; the flywheels are saturated in $H_z$, this angular momentum then being transferred to the spacecraft in order to slow its angular velocity $\omega_z$. After this step, since the angular momentum $h_z$ of the spacecraft is sufficiently low ($h_z$=−3 Nms), the angular momentum reducing step is stopped. The process then comprises a step 53 consisting in cancelling out the angular momentum of the spacecraft by means of the angular momentum accumulating device.

Implementation of such a method, split between a step 51 of accumulating angular momentum at constant angular velocity and a step 52 of reducing the angular momentum without external disturbance is particularly advantageous because it allows the impact of the method on the orbit of the spacecraft to be limited. By distributing the thrust delivered by the thruster over one or more revolutions of the spacecraft, it becomes possible to compensate for undesirable velocity increments inherent to the thrust. It is possible, as is the case in FIGS. 4*a*, 4*b* and 4*c*, to apply a constant thrust during one complete revolution of the spacecraft. It is also possible to define a sequence of a number of thrusts applied over one or more revolutions of the spacecraft. The method according to the invention therefore allows a great flexibility in the angular momentum reducing step, allowing it to be adapted to various design or operational constraints, such as for example a maximum capacity, in angular momentum or torque, of the angular momentum accumulating device 15, a maximum or minimum firing duty cycle of the propulsion device 13, a battery lifetime, or a maximum velocity increment requirement of the spacecraft in its orbit.

Figure 5:
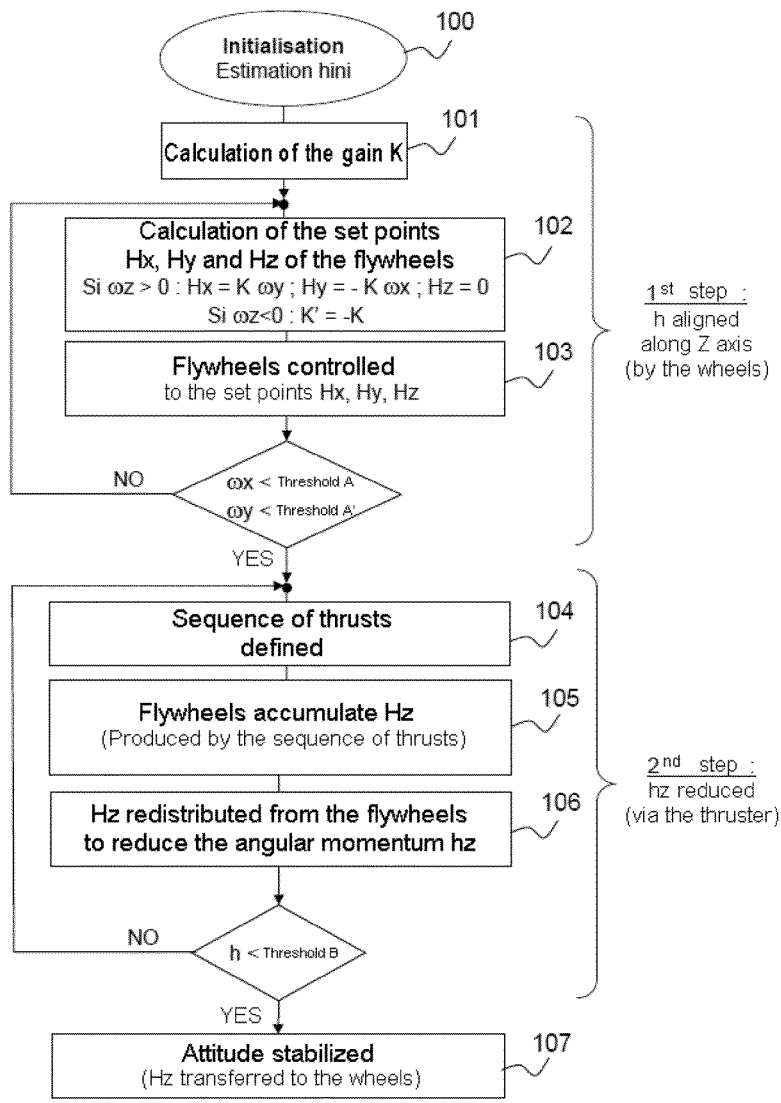
FIG. 5 illustrates, in the form of a flowchart, one embodiment of the method according to the invention.

FIG. 5 illustrates, in the form of a flowchart, an embodiment of the method according to the invention. It comprises the following steps:
an initialisation step 100, notably ensuring acquisition of measurements of the angular velocities $\omega_x$ and $\omega_y$, and the initial angular momentum $h_{ini}$ of the spacecraft;
a step 101 of calculating the coefficient K depending on the initial conditions of the spacecraft defined when the angular momentum reducing method is launched;
a step 102 of calculating angular momentum setpoints $H_x$, $H_y$ and $H_z$ for the angular momentum accumulating device 15 along the X, Y and Z axes, depending on the coefficient K and the angular velocities $\omega_x$ and $\omega_y$ of the spacecraft along the X and Y axes;
a step 103 of controlling the angular velocities of flywheels in a way that sets the angular momentum of the flywheels along each of the axes to the setpoint values $H_x$, $H_y$ and $H_z$ defined in the preceding step; successive steps 102 and 103 being continued provided that the angular velocities $\omega_x$ and $\omega_y$ of the spacecraft along the X axis and the Y axis are above a preset threshold;
a step 104 of defining a sequence of thrusts delivered by the propulsion device 13;
a step 105 of accumulating, along the Z axis, using the angular momentum accumulating device 15, angular momentum resulting from the sequence of thrusts; the Z-axis torque generated by the thrust sequence, of opposite sign to the angular velocity of the spacecraft along the Z axis, being absorbed by the angular momentum accumulating device so as to keep the angular velocity of the spacecraft along the Z axis constant; this step, implemented at constant angular velocity, allowing undesirable velocity increments inherent to the thrusts delivered by the propulsion device 13 to be limited. Steps 102 and 103 remain active during this phase in order to keep the satellite rotating about the Z axis.
a step 106 of redistributing angular momentum, consisting in reducing the angular momentum of the spacecraft by transferring the angular momentum accumulated by the angular momentum accumulating device 15 to the spacecraft,
successive steps 104, 105 and 106 being stopped when the norm of the angular momentum of the spacecraft along is lower than a preset threshold; and
a step 107 of stabilising the attitude of the spacecraft, consisting in cancelling out the angular momentum of the spacecraft by means of the angular momentum accumulating device 15 when the angular momentum of the spacecraft is lower than a preset threshold.

The method according to the invention is not limited to the embodiment shown in FIG. 5. Depending on the architecture of the spacecraft and launch vehicle and depending on the operational requirements of the various phases using said method, certain of the steps described above may not be implemented and other steps will possibly also be added.

As has been seen, it may in particular be advantageous to provide an additional step consisting in suspending control of the angular velocities of the flywheels when $\omega_z$ is positive or when $\omega_z$ is negative with the aim of controlling the direction of rotation of the spacecraft after the alignment step, thereby allowing a direction for the torque required for the step of reducing the angular momentum of the spacecraft to be guaranteed.

Moreover, the sequence of thrusts defined in step 104 may advantageously comprise a plurality of thrusts delivered in succession during one or more revolutions of the spacecraft about the Z axis; the sequence of thrusts being configured in order to compensate for the velocity increments inherent to each of the thrusts.

Thus, the angular momentum accumulating step 105 is advantageously stopped when the angular momentum along the Z axis of the angular momentum accumulating device reaches a preset maximum value; the successive steps of accumulating and redistributing angular momentum are repeated a number of times until the angular momentum of the spacecraft along the Z axis is lower than a preset threshold.

Figure 6:
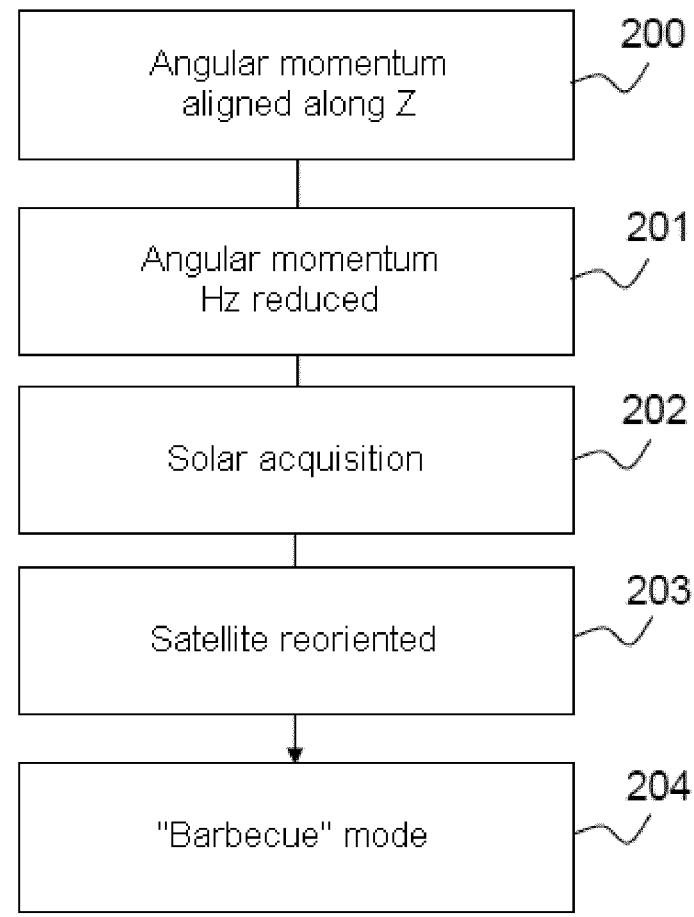
FIG. 6 illustrates, in the form of a flowchart, an example of implementation of the method in an attitude and orbit control system of a spacecraft.

FIG. 6 illustrates, in the form of a flowchart, an example of implementation of the method in an attitude and orbit control system (AOCS) of a spacecraft. The method comprises steps of aligning 200 and reducing 201 the angular momentum of the spacecraft, such as described above. After step 201, the attitude of the spacecraft being stable, the method comprises a step 202 consisting in detecting the position of the Sun by means of the set of sensors, for example via a rotation of 360° about any axis, and a step 203 consisting in orienting the spacecraft relative to the Sun by means of the angular momentum accumulating device or even using thrusters. In a step 204, the satellite enters into what is generally called a barbecue mode, consisting in keeping the orientation of the spacecraft constant relative to the Sun, thereby ensuring batteries are recharged.

By slaving the angular momentum of the flywheels crosswise to the angular velocities of the spacecraft along two perpendicular axes, the method described by the present invention ensures a rapid convergence on an axis of maximum or minimum inertia. Orientation of the angular momentum along one axis, the ability to choose a flat spin or normal spin axis, and the ability to control the convergence direction of rotation, provides a new and great flexibility in the design of spacecraft propulsion devices. The method is therefore particularly suitable for application to a satellite equipped only with electric thrusters. Reducing angular momentum that is limited to a single axis in two steps, first by accumulating angular momentum in wheels, then by transferring it to the satellite, allows the orbit of the satellite to be controlled during this critical attitude stabilisation phase. A limited velocity increment compatible with multisatellite launches is guaranteed.

The invention also relates to an attitude and orbit control system comprising a control module containing code instructions allowing the method having the features described above to be implemented.

The invention also relates to an Earth-orbiting satellite equipped with an attitude and orbit control system having the features described above.

The invention claimed is:

1. A method for reducing an angular momentum of a spacecraft, the spacecraft comprising:
   a propulsion device able to generate a torque of modulatable amplitude along a Z axis, the Z axis corresponding substantially to an axis of maximum inertia or minimum inertia of the spacecraft, an X axis and a Y axis forming with Z a direct orthogonal frame attached to the spacecraft;
   an angular momentum accumulating device, able to generate and control, via control of angular velocities of flywheels belonging to the angular momentum accumulating device, an angular momentum and a torque along the X, Y and Z axes; and
   a set of sensors able to measure angular velocities $\omega_x$, $\omega_y$, $\omega_z$) of the spacecraft along the X, Y and Z axes, and to deliver an estimation of the angular momentum of the spacecraft;
   wherein said method comprises:
   a first step of aligning the angular momentum of the spacecraft along the Z axis, which includes slaving the angular momentum of the angular momentum accumulating device along the X axis and the Y axis, respectively, to the angular velocity of the spacecraft, along the Y axis and the X axis, respectively, creating gyroscopic torques that tend to reduce the angular velocities of the spacecraft along the X and Y axes; and
   a second step of reducing the angular momentum of the spacecraft by means of a Z-axis torque generated by the propulsion device.

2. The method according to claim 1, wherein the alignment step comprises:
   a step of calculating angular momentum setpoints $H_x$, $H_y$ and $H_z$ for the angular momentum accumulating device along the X, Y and Z axes, respectively, depending on the angular velocities $\omega_x$, $\omega_y$, and $\omega_z$ of the spacecraft along the X, Y and Z axes, respectively, by means of the following relationships, when $\omega_z$ is positive:

$$H_x = K\omega_y$$

$$H_y = -K\omega_x$$

$$H_z = 0$$

in which K is a preset coefficient; the same relationships being employed when $\omega_z$ is negative, the coefficient K being replaced with a coefficient K'; said coefficient K' being given by the relationship K'=−K; and
   a step of controlling the angular velocities of the flywheels so as to set the angular momentum of the flywheels along each of the axes to the setpoint values $H_x$, $H_y$ and $H_z$ determined in the preceding step,
   wherein the alignment step continues provided that the angular velocity of the spacecraft along the X and Y axes is higher than a preset threshold.

3. The method according to claim 2, wherein the coefficient K is set depending on the initial conditions of the spacecraft, defined when said method is started.

4. The method according to claim 2, wherein the alignment step comprises a step of suspending the slaving of the angular momentum of the angular momentum accumulating device when $\omega_z$ is positive or when $\omega_z$ is negative, making it possible to guarantee a direction for the Z-axis torque required for the step of reducing the angular momentum of the spacecraft.

5. The method according to claim 1, wherein the step of reducing the angular momentum comprises in succession steps of:
   accumulating, along the Z axis, using the angular momentum accumulating device, angular momentum resulting from a sequence of thrusts delivered by the propulsion device; the Z-axis torque generated by the thrust sequence, of opposite sign to the angular velocity of the spacecraft along the Z axis, being absorbed by the angular momentum accumulating device so as to keep the angular velocity ($\omega_z$) of the spacecraft along the Z axis constant; and of redistributing angular momentum, which includes reducing the angular momentum of the spacecraft by transferring the angular momentum accumulated by the angular momentum accumulating device to the spacecraft, the step of accumulating angular momentum, implemented for a constant spacecraft angular velocity, allowing undesirable velocity increments inherent to the thrusts delivered by the propulsion device to be limited.

6. The method according to claim 5, wherein the sequence of thrusts comprises a plurality of thrusts delivered in succession during one or more revolutions of the spacecraft about the Z axis; the sequence of thrusts being configured in order to compensate for the velocity increments inherent to each of the thrusts.

7. The method according to claim 6, wherein the angular momentum accumulating step is stopped when the angular momentum along the Z axis of the angular momentum accumulating device reaches a preset maximum value; the successive steps of accumulating and redistributing angular momentum being repeated a number of times until the angular momentum of the spacecraft along the Z axis is lower than a preset threshold.

8. The method according to claim 1, wherein the step of reducing angular momentum is stopped when the angular momentum of the spacecraft along the Z axis is lower than a preset threshold.

9. The method according to claim 1, further comprising cancelling out the angular momentum of the spacecraft by means of the angular momentum accumulating device when the angular momentum of the spacecraft is lower than a preset threshold.

10. The method according to claim 1, further comprising detecting the position of the Sun by means of the set of sensors, and orienting the spacecraft relative to the Sun by means of the angular momentum accumulating device.

11. An attitude and orbit control system comprising a control module containing code instructions allowing the method according to claim 1 to be implemented.

12. An earth-orbiting satellite equipped with an attitude and orbit control system according to claim 11.

* * * * *